(12) United States Patent
Modi (10) Patent No.: US 9,781,794 B1
(45) Date of Patent: Oct. 3, 2017

(54) SYSTEM AND METHOD FOR OPTIMIZING LIGHTING IN RESPONSE TO ONLINE WEATHER DATA

(71) Applicant: Echelon Corporation, Santa Clara, CA (US)

(72) Inventor: Sohrab Modi, Oakland, CA (US)

(73) Assignee: Echelon Corporation, Santa Clara, CA (US)

( * ) Notice: Subject to any disclaimer, the term of this patent is extended or adjusted under 35 U.S.C. 154(b) by 0 days.

(21) Appl. No.: 15/354,025

(22) Filed: Nov. 17, 2016

(51) Int. Cl.
  *H05B 37/02* (2006.01)
  *H05B 33/08* (2006.01)

(52) U.S. Cl.
  CPC ..... *H05B 33/0845* (2013.01); *H05B 33/0857* (2013.01); *H05B 37/0218* (2013.01); *H05B 37/0227* (2013.01); *H05B 37/0245* (2013.01); *H05B 37/0254* (2013.01); *H05B 37/0272* (2013.01); *H05B 37/0281* (2013.01)

(58) Field of Classification Search
  CPC ............ H05B 37/0218; H05B 37/0227; H05B 37/0245; H05B 37/0254; H05B 37/0272; H05B 37/0281
  USPC ......................................... 315/307, 312, 360
  See application file for complete search history.

(56) References Cited

U.S. PATENT DOCUMENTS

| 8,209,061 | B2 | 6/2012 | Palmer et al. | |
| 2012/0062123 | A1 | 3/2012 | Jarrell | |
| 2012/0098445 | A1* | 4/2012 | Park | H05B 37/0272 315/193 |
| 2012/0262069 | A1* | 10/2012 | Reed | H05B 37/0218 315/130 |
| 2012/0293077 | A1 | 11/2012 | Tousain et al. | |
| 2013/0076926 | A1 | 3/2013 | Arnold | |
| 2013/0193856 | A1* | 8/2013 | Chalmers | H05B 37/02 315/153 |
| 2014/0117852 | A1 | 5/2014 | Zhai et al. | |
| 2015/0212236 | A1 | 7/2015 | Haas et al. | |
| 2016/0286629 | A1* | 9/2016 | Chen | H05B 37/0272 |

\* cited by examiner

*Primary Examiner* — Tung X Le
(74) *Attorney, Agent, or Firm* — Locke Lord LLP (57) ABSTRACT

A distributed lighting network has its lights scheduled based on weather forecast information. A lighting controller stores a lighting schedule for distribution to the distributed lighting network and transmits the lighting schedule to the network. The lighting controller receives from a subscription weather server, short-term or long-term weather forecast datasets. The lighting controller generates lighting control information to modify the lighting schedule, based on the received customized weather forecast datasets, and transmits the lighting control information to the distributed lighting network to modify the lighting schedule, based on the customized weather forecast datasets. The system also enables the lighting schedules to modulate human circadian rhythms if necessary to further promote public health and safety during weather events.

30 Claims, 6 Drawing Sheets

FIG. 3
LIGHTING DEVICE NODE "N1" 104

SYSTEM AND METHOD FOR OPTIMIZING LIGHTING IN RESPONSE TO ONLINE WEATHER DATA

FIELD OF THE INVENTION

The invention disclosed broadly relates to controlling a distributed lighting network based on weather forecast information, and more particularly relates to a lighting controller distributing a lighting schedule, that is built from expected weather conditions, to a distributed lighting network, receiving weather forecast datasets from a subscription weather server, and distributing lighting control signals to the distributed lighting network to modify the lighting schedule, based on the weather forecast datasets and, if necessary, allow lighting to be adjusted to modulate circadian rhythms because of weather conditions.

BACKGROUND OF THE INVENTION

Lighting is always important because it not only influences human circadian rhythms but also mood and human perception of security and safety. Lighting is also very important for human comfort. Many of us are afraid of the dark. This fear of the dark is usually not fear of darkness itself, but fear of possible or imagined dangers concealed by darkness. When this fear is excessive, it becomes a phobia and humans will often act irrationally and possibly become a danger to themselves and others. In fact, an estimated 8.7% of Americans, or 19.2 million people, suffer from a specific phobia. Also 11% fear the dark and 2% fear storm related events such as deep darkness, thunder and lightning. These fears and phobia's are even more serious in combination when people travel, drive or operate machinery in dreary seasonal or inclement weather conditions.

Lighting is important in all seasonal and weather conditions but especially important during inclement weather which amplifies many human fears. There can be additional impacts if circadian rhythms are negatively altered by external cues such as lighting. One novel way to inexpensively improve both our safety and generate a calming mood during intervals of seasonal or inclement weather is to consider compensating for threatening weather conditions by using lighting to reassure and calm humans in anticipation to and during problematic weather conditions. Also considering weather in conjunction with the time of day for a lighting change can be exploited to minimize circadian disruption or drive a desired change to circadian rhythm in anticipation of a long term weather event such as a major snowstorm. You can pretty much count on lighting being present at locations where humans are active during seasonal weather conditions or inclement weather. Converting the existing lighting to counteract human phobias and fears is a start. Also using the existing lighting infrastructure in combination with weather inputs and other sensors can not only help people sleep better but can pro-actively calm travelers, motorists and pedestrians alike.

But lighting is usually locked into particular solutions that are not flexible, intelligent or easily changed as weather conditions vary. Nor are existing lighting solutions responsive to circadian rhythms. Another ongoing problem with lighting combating the darker side of human nature is the need for proper lighting effects not just whether they can be turned on and off to illuminate an area.

Proper lighting is important. The cones in the human eye are active in higher light-levels (photopic vision) and enable human color vision. Unfortunately, cones are non-functional in low-light. Rods are responsible for our vision in low-light conditions (scotopic vision). Rods are much higher in number than cones (120 million vs. 6 million) and they are more sensitive, but not to color. Within your rods lies Rhodopsin, the chemical that actually allows night vision. When exposed to light, Rhodopsin bleaches and takes around 30 minutes to regenerate. Despite taking so long to regenerate, most night vision begins to return within about 5-10 minutes once the bleaching from bright light stops. Therefore, at night, a row of street lights are effectively flashing and subsequently bleaching Rhodopsin, when seen from a moving vehicle. This is potentially a dangerous situation since the effect will reduce vision at night (while driving). A moonless and starless cloudy night only exacerbates the situation. Add in weather events such as fog, rain or snow and a much bigger problem emerges due to light reflection, refraction and scattering obscuring vision.

Therefore, it is important to manage lighting during transitions from light to darkness to avoid temporarily inhibited vision. The Rhodopsin contained within the rods in your eyes is less sensitive to the color red (longer wavelengths of light). You may have seen the Military using red light to allow them to read maps while preserving their night vision. However, there has been a shift recently to using green light or a blue-green light instead of red. Green allows for more visual acuity and better differentiation between colors at low-light levels. Both red and green light at high output will still disable your night vision, no matter what color, so intensity is still part of the lighting management challenge. Therefore, choose your colors carefully and avoid excessive illumination at night. It is also important to soften any change since it's better than quickly getting hit with a dark environment or alternating light/dark environments (flashing lighting . . . etc.). If you're doing anything at night, high-output white light will disable your night vision fastest. But, you can always benefit from a different spectrum and avoiding abrupt changes, provided it's reasonably low-light.

Today the consensus is that a dim red light will have the least effect on your night vision. That is why astronomers and soldiers use flashlights with red lenses. This means it is important to control not only light color but intensity. It has been found that animals (hamsters in one study) exposed to red light at night had significantly less evidence of depressive-like symptoms and changes in the brain linked to depression, compared to those that experienced blue or white light. Research findings suggest that if we could use red light when appropriate for night-shift workers, it may reduce some of the negative effects on their health from white light. This also applies to periods of darkness caused by seasonal (in some parts of the world such as Seattle) or inclement weather. Seasonal and inclement weather is known to impact humans by disrupting circadian rhythms which can be counteracted by modulating external cues such as lighting.

Our eyes sense light slightly differently in darkness than in daylight. In day light our eyes are most sensitive to green light, they are slightly less sensitive to yellow and blue light, they are only one half as sensitive to orange and lavender light and they are only one tenth as sensitive to red and violet light. Thus for viewing at a distance, a 100 watt green light bulb can be seen about 3 times farther than a red or violet bulb of the same light power. Thus red is the worst color for seeing at a distance. You can observe this on a clear dark night from a hilltop looking at distant traffic signals. The yellow light will be brightest, the green light (which is slightly blue) will be seen almost as bright and the red light will be quite dim. For the same reason, on newer cars with yellow turn indicators, you will notice that they are much brighter than the red turn indicators on older cars.

In darkness the eyes maximum sensitivity shifts toward yellow-green wavelengths with the other colors staying at about the same sensitivity. As we understand more and more about human anatomy and psychology we can apply that knowledge to utilizing lighting for positive impacts to health, safety and human behavior.

The proper mix of color, intensity and spectral range is useful in enhancing human vision in many lighting situations, especially in inclement weather. But both indoor and outdoor lighting solutions today do not consider weather or circadian rhythms separately or jointly during their operation and have no ability to react to actual and anticipated weather conditions.

Increasingly, new applications beyond simply providing the ability to schedule your lights to turn on and off at specific times throughout the day will emerge and allow the lighting industry to take the next step of dynamically addressing all our lighting needs; at home, office, shopping etc., while traveling between these activities in any kind of season or weather conditions. In addition, impacts to human circadian rhythms can be modulated as needed in any kind of weather or seasonal conditions. This evolutionary step enables cities to become increasingly responsive by adjusting lighting to a variety of real-time weather conditions to enhance safety, increase human comfort, set moods, improve livability and maximize the quality of life.

SUMMARY OF THE INVENTION

Example embodiments of the invention control a distributed lighting network based on weather forecast information. A lighting controller distributes a lighting schedule, set up to consider future weather conditions, to a distributed lighting network. The lighting controller randomly receives weather forecast datasets from a subscription weather server. In response, the lighting controller distributes lighting control signals to the distributed lighting network to modify the lighting schedule, based on either short-term or long-term weather forecast datasets.

In accordance with example embodiments of the invention, a memory in the lighting controller is configured to store a lighting schedule for distribution to a distributed lighting network. A transmitter in the lighting controller is configured to distribute the lighting schedule to the distributed lighting network. A receiver in the lighting controller, is coupled to a subscription weather server, and is configured to receive weather forecast datasets. A processor in the lighting controller is configured to generate lighting control information to modify the lighting schedule, based on the received weather forecast datasets. The transmitter in the lighting controller is further configured to distribute the lighting control information to the distributed lighting network to modify the lighting schedule, based on the weather forecast datasets.

In accordance with the example embodiments of the invention the lighting schedule may be modified to consider weather at a particular time of day or the duration of the weather event. Both can be exploited to minimize circadian disruption or drive a desired change to the human circadian rhythms in anticipation of a longer term weather event such as a major snow fall or prolonged rainy weather. The lighting schedule may be at least one of static, periodic by day, week, month, season, year, or adjusted due to time of day or weather event duration to achieve a desired impact on human circadian cycle.

In accordance with example embodiments of the invention, the lighting schedule may be static or periodic by day, week, month, season or year. The lighting schedule may control on/off lighting, light dimming sequences to an on or off state, light color frequency selection, light color intensity of red, green, and blue light components, light level brightening or dimming based on predicted duration for type of weather condition, or light level brightening or dimming based on length of daylight for day of year.

In accordance with example embodiments of the invention, the weather forecast datasets from the subscription weather server may comprise data representing localized weather forecasts for a geographical region encompassing the distributed lighting network, the datasets comprising at least one of tables, maps, or sensor information that includes at least one of ambient temperature, pressure, or humidity.

In accordance with example embodiments of the invention, the modification of the lighting schedule may comprise at least one of changing times for lighting to go on or off, changing color/frequency of the lighting, brightening intensity in response to a severe storm, softening intensity in response to a moderate storm, changing dimming, or changing rate of onset of light change.

In accordance with example embodiments of the invention, the lighting controller, is further configured to distribute lighting control signals to the distributed lighting network to modify the lighting schedule, based on lunar phases or level of starlight, in combination with the received weather forecast datasets.

In accordance with example embodiments of the invention, the modification of the lighting schedule comprises changing spectral range of lighting to enhance visual acuity during periods of cloudiness or overcast.

In accordance with example embodiments of the invention, the modification of the lighting schedule comprises changing lighting intensity to enhance night vision during periods of cloudiness or overcast.

In accordance with example embodiments of the invention, the modification of the lighting schedule comprises changing brightness or spectral range of lighting to counteract a mood of depression due to seasonal affective disorder during periods of cloudiness or overcast.

In accordance with example embodiments of the invention, the subscription weather server bases the weather forecast datasets on at least one of images from one or more cameras or sensor data from one or more sensors in a geographical region encompassing the distributed lighting network.

DISCUSSION OF THE PREFERRED EMBODIMENTS

Figure 1:
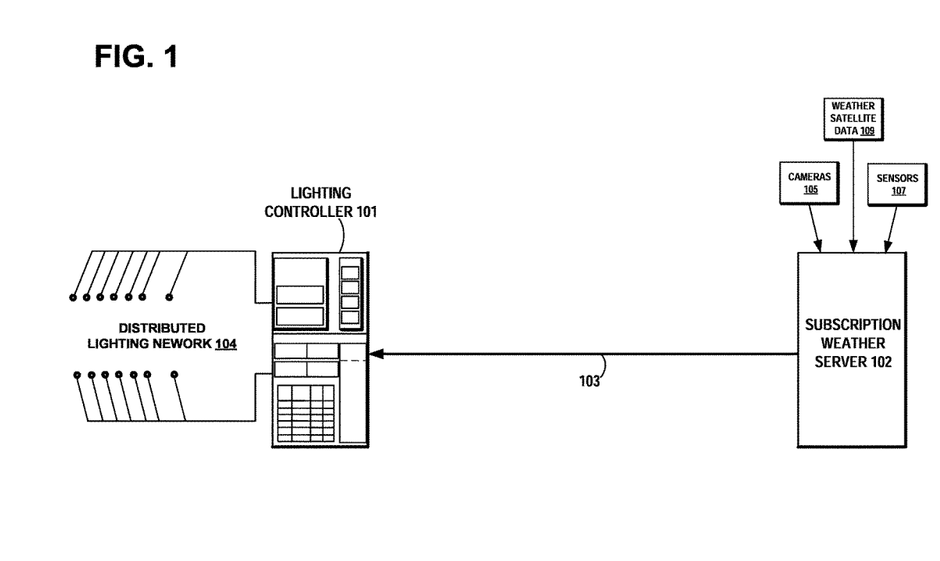
FIG. 1 illustrates an example network diagram of the lighting controller coupled over a network, such as the Internet, to the subscription weather server. The subscription weather server gathers weather data from weather satellites, sensors and cameras and delivers both short-term and long-term weather forecast datasets to subscribers of the service.

Example embodiments of the invention control a distributed lighting network based on weather forecast information. A lighting controller distributes a lighting schedule to a distributed lighting network. The lighting controller receives both short-term or long-term weather forecast datasets from a subscription weather server. In response, the lighting controller distributes lighting control signals to the distributed lighting network to modify the lighting schedule, based on the weather forecast datasets and if necessary also modify lighting to modulate circadian rhythms FIG. 1 illustrates an example network diagram of the lighting controller 101 coupled over a network 103, such as the Internet, to the subscription weather server 102. The lighting controller 101 controls the scheduling and lighting patterns of a plurality of lighting devices in the distributed lighting network 104. The subscription weather server 102 gathers weather data from weather satellites 109, weather sensors 107, and cameras 105 and delivers both short-term or long-term customized weather forecast datasets to subscribers of the service, such as the lighting controller 101. The subscription weather server 102 may use images from photos or videos to forecast local weather patterns. The weather forecast datasets generated by the subscription weather server 102 may include data representing localized weather forecasts for a geographical region encompassing the distributed lighting network, the datasets including at least one of tables, maps, or sensor information that includes at least one of cloud cover, current weather events, ambient temperature, pressure, or humidity. Weather forecast predictions may be developed for a particular area, both macro-areas such as city-wide, county-wide, or state-wide areas and for micro-areas such as a city block, a zip code, or a portion of zip code. An example of the weather server 102 is the IBM Deep Thunder research project, which has the objective of improving local weather forecasting through the use of high-performance computing.

Figure 2A:
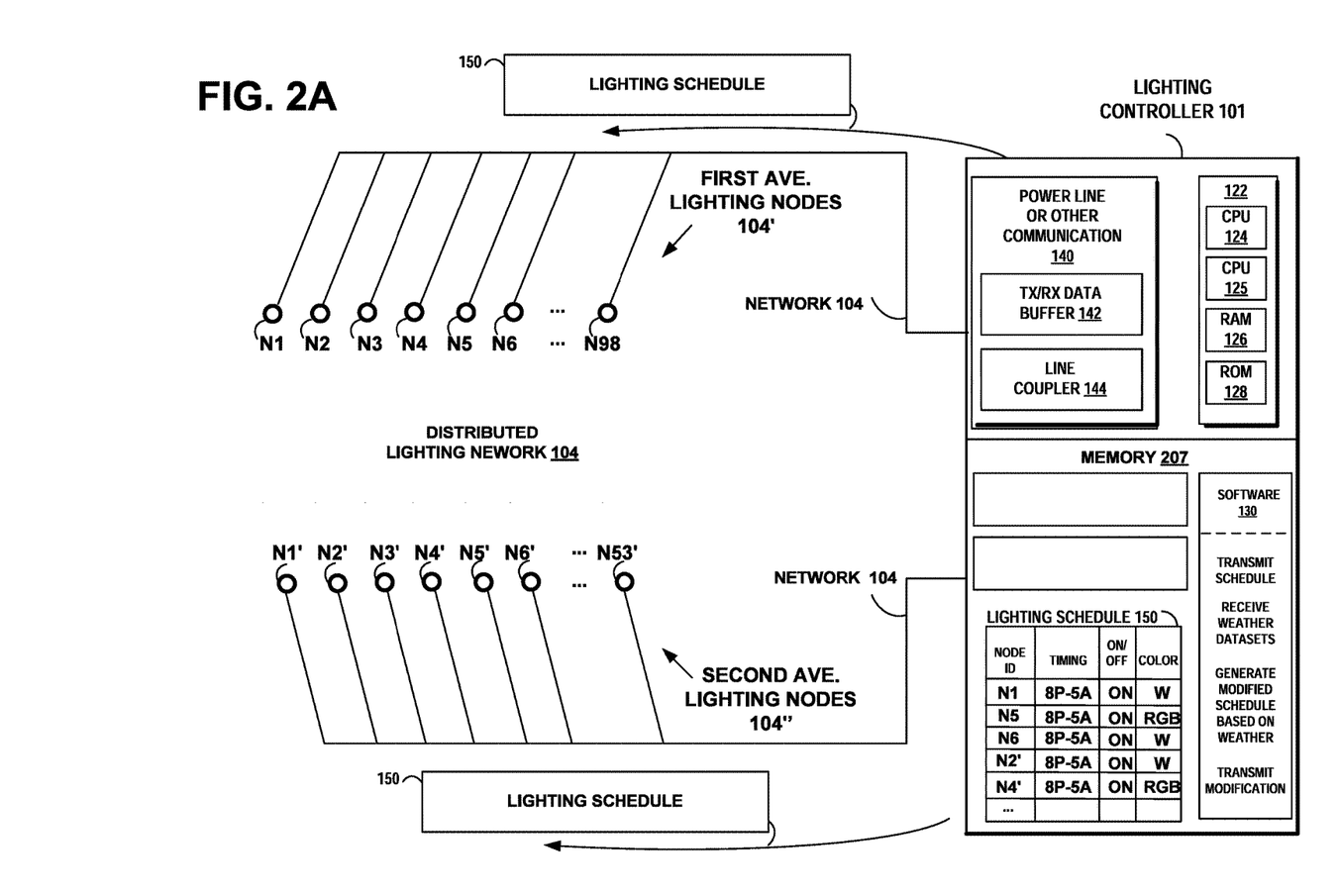
FIG. 2A illustrates an example embodiment of the invention, wherein the lighting controller distributes a lighting schedule to a distributed lighting network.

FIG. 2A illustrates an example embodiment of the invention, wherein the lighting controller 101 distributes a lighting schedule 150 to the distributed lighting network 104. A plurality of lighting devices in the distributed lighting network 104. Lighting devices N1, N2, N3, N4, N5, N6, . . . N98 are in a first branch 104' along First Ave. and lighting devices N1', N2', N3', N4', N5', N6', . . . N53' are in a second branch 104" along Second Ave. Other branches, not shown, could light up parks, bridges, bike and hiking trails, parking lots, etc. Each lighting device includes an LED lighting array and digital components shown in FIG. 3.

The lighting controller 101 includes a processor 122 comprising a dual central processor unit (CPU) or multi-CPU 124/125, a random access memory (RAM) 126 and read only memory (ROM) 128. The memories 126 and/or 128 include computer program code, including control software 130. The lighting controller 101 includes the lighting schedule 150 in the memory 207. The lighting controller 101 includes a power line or other communications unit 140 that includes a transmit/receive (TX/RX) buffer 142 and a power line or other medium coupler 144, which is configured to communicate with the lighting devices 104' and 104" via the network 104, which may be a power line operated as a communication link. Other examples of the network 104, include twisted pair, coax cable, Ethernet, Infrared, RFID, WiFi, Bluetooth, Bluetooth Low Energy, ultra-narrow band communications protocol from Sigfox, LTE-M, any Low Power Wireless Area Network (LPWAN) protocol, any M2M communication protocol, cellular, IEEE 802.15.4 RF, or LoRa Low Power Wide Area Network. In an alternate embodiment, the lighting controller 101 may include a radio communications unit that includes a transmit/receive (TX/RX) buffer a cell phone transceiver and a WiFi transceiver to communicate with the lighting devices 104 via radio communications units in the devices.

The lighting schedule 150 may be static or periodic by day, week, month, season or year. The lighting schedule 150 may schedule on/off lighting, light dimming sequences to an on or off state, light color frequency selection, light color intensity of red, green, and blue light components, light level brightening based on predicted duration for type of weather condition, or light level brightening based on length of daylight for day of year. The lighting schedule 150 shown in the figure, has columns for node ID, timing, On/OFF selection, and color. Additional fields, not shown in the figure, may be specified such as date, duration of light, dimming, speed to brightest setting, speed to dimmest setting, individual red green and blue intensities, etc.

The lighting controller 101 includes program software 130 in the memory 207, to transmit schedule, receive weather datasets, generate modified schedule based on weather, and transmit modification. The program software 130 may also consider the expected time of day of weather events and their duration to further adjust lighting to either minimize or enhance impacts to circadian rhythms as necessary, such as using lighting to prepare people for long seasonal duration weather events such as prolonged cloudiness or major snow storms and counteract some of the potential negative effects of weather.

Figure 2B:
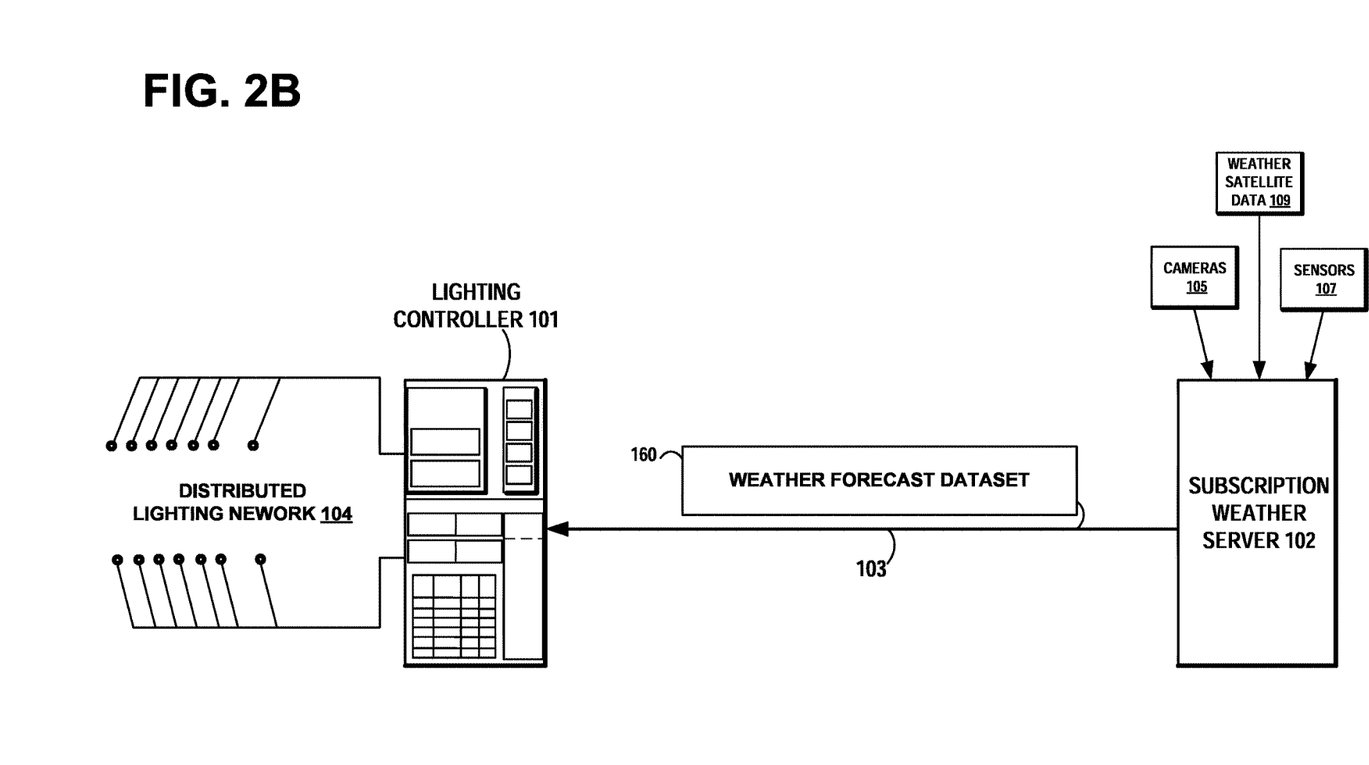
FIG. 2B illustrates the example embodiment of the invention in FIG. 1, wherein the lighting controller receives both short-term and long-term weather forecast datasets from the subscription weather server.

FIG. 2B illustrates the example embodiment of the invention in FIG. 1, wherein the lighting controller 101 receives a long-term or short-term weather forecast datasets 160 over the network 103 from the subscription weather server 102. The received weather forecast datasets 160 may forecast a short-term event of an impending storm approaching the geographical region encompassing the distributed lighting network 104.

Figure 2C:
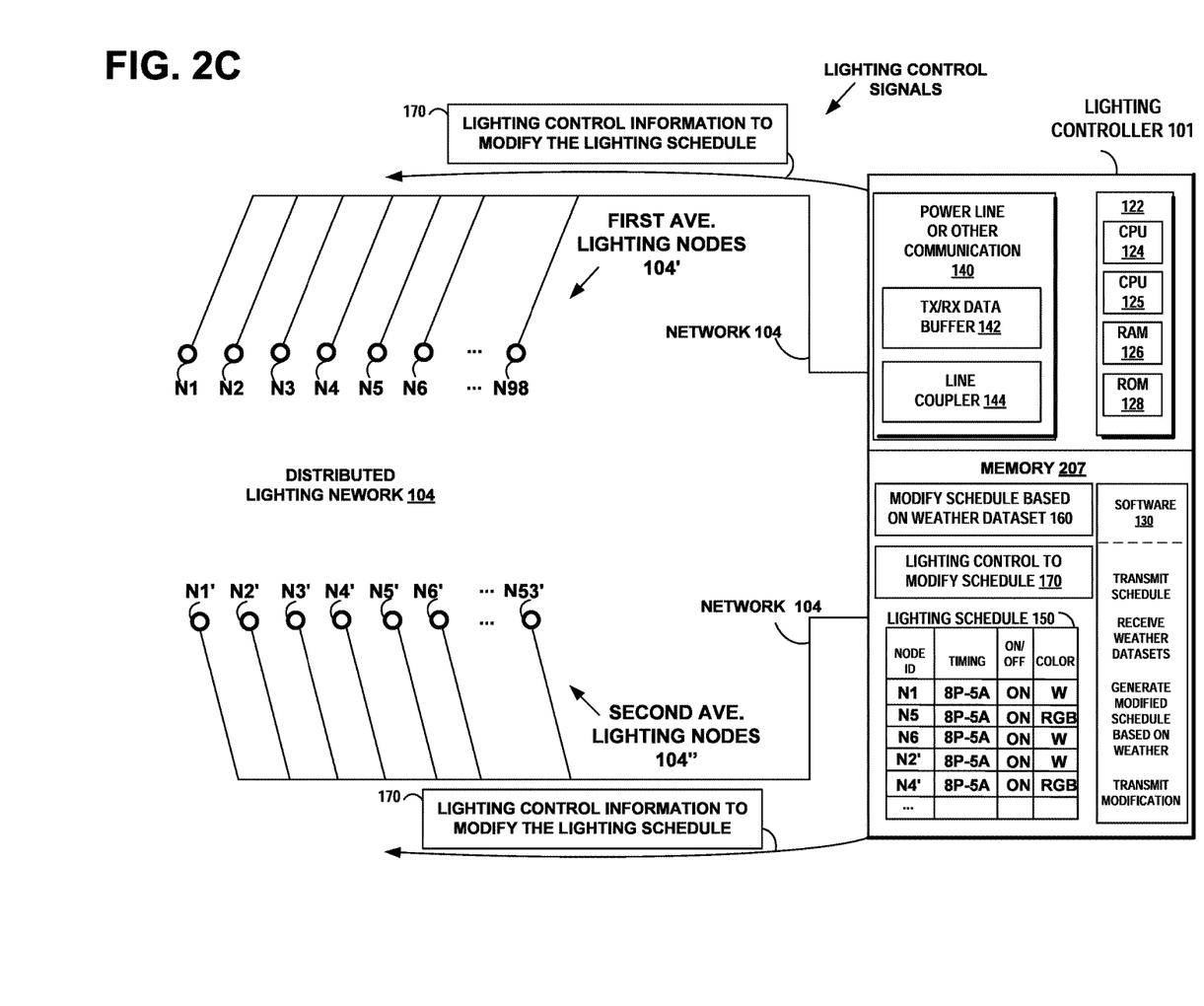
FIG. 2C illustrates the example embodiment of the invention in FIG. 2A, wherein the lighting controller distributes a lighting schedule to the distributed lighting network to modify the lighting schedule, based on the weather forecast datasets.

FIG. 2C illustrates the example embodiment of the invention in FIG. 2A, wherein the processor 122 in the lighting controller 101, is programmed to generate a message specifying the modification 170 of the lighting schedule 150 or a modified lighting schedule. The modification 170 of the lighting schedule 150, is based on the received weather forecast datasets 160. The modification 170 may be at least one of changing times for lighting to go on or off, changing color/frequency of the lighting, brightening intensity in response to a severe storm, choosing a softer intensity in response to a moderate storm, changing the dimming setting, or changing rate of onset of light change.

In accordance with embodiments of the invention, lighting controller 101 may be further configured to distribute lighting control signals 170 to the distributed lighting network 104 to modify the lighting schedule 150, based on lunar phases, amount of cloud cover or level of starlight, in combination with the received weather forecast datasets 160.

In accordance with embodiments of the invention, lighting controller 101 may be further configured to distribute lighting control signals 170 to the distributed lighting network 104 to modify the lighting schedule 150, based on changing spectral range of lighting to enhance visual acuity during periods of cloudiness, weather events or overcast.

In accordance with embodiments of the invention, lighting controller 101 may be further configured to distribute lighting control signals 170 to the distributed lighting network 104 to modify the lighting schedule 150, based on changing lighting intensity to enhance night vision during periods of cloudiness, weather events or overcast.

In accordance with embodiments of the invention, lighting controller 101 may be further configured to distribute lighting control signals 170 to the distributed lighting network 104 to modify the lighting schedule 150, based on changing brightness or spectral range of lighting to counteract a mood of depression due to seasonal affective disorder during periods of cloudiness, weather events or overcast.

Figure 3:
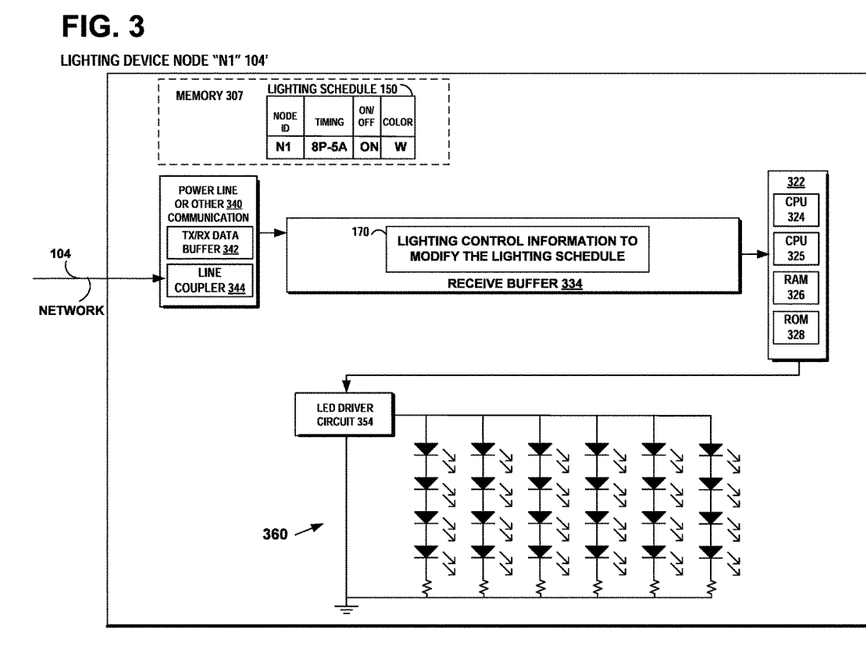
FIG. 3 illustrates an example embodiment of the invention, showing an example lighting device connected to the network. The lighting device includes a copy of the lighting schedule in its memory, received from the lighting controller, which schedule the lighting device normally follows. The lighting device includes a receive buffer that buffers lighting control information received from the lighting controller as lighting control signals. The lighting control information modifies the lighting schedule, based on the weather forecast datasets received by the lighting controller from the subscription weather server.

FIG. 3 illustrates an example embodiment of the invention, showing an example lighting device N1 connected to the network 104. The lighting device includes an example copy of a lighting schedule 150 in its memory 307, received from the lighting controller 101. The lighting device N1 normally follows the schedule 150. The lighting device N1 includes a receive buffer 334 that buffers the lighting control information 170 received from the lighting controller 101 as lighting control signals. The lighting control information 170 modifies the lighting schedule 150 or presents a modified lighting schedule, based on the weather forecast datasets 160 received by the lighting controller 101 from the subscription weather server 102.

The example lighting device N1 shown in FIG. 3, includes a power line or other communications unit 340 that includes a transmit/receive (TX/RX) buffer 342 and a power line or other medium coupler 344, which is configured to communicate with the lighting controller 101 via the network 104, which may be a power line operated as a communication link. The lighting control information messages 170 received from the lighting controller 101, are buffered in the receive buffer 334. The device N1 activates the LED driver circuit 354 controlled by the processor 322, to power the LED light array 360. Depending on the control parameters in the lighting control information messages 170, the light array 360 may be turned on, its illumination level adjusted, its color changed, or turned off, in response. The LED driver circuit 354 controls the voltage and current patterns sent to each LED element (Red, Green, Blue) in the LED array 360. The LED array 360 may be a single light fixture with a plurality of Red, Green and Blue LEDs contained in the light fixture, or it may be an array of LED's.

The example lighting device N1 includes a processor 322 comprising a dual central processor unit (CPU) or multi-CPU 324/325, a random access memory (RAM) 326 and read only memory (ROM) 328. The memories 326 and/or 328 include computer program code for responding to lighting control information messages 170 from the lighting controller 101.

Figure 4:
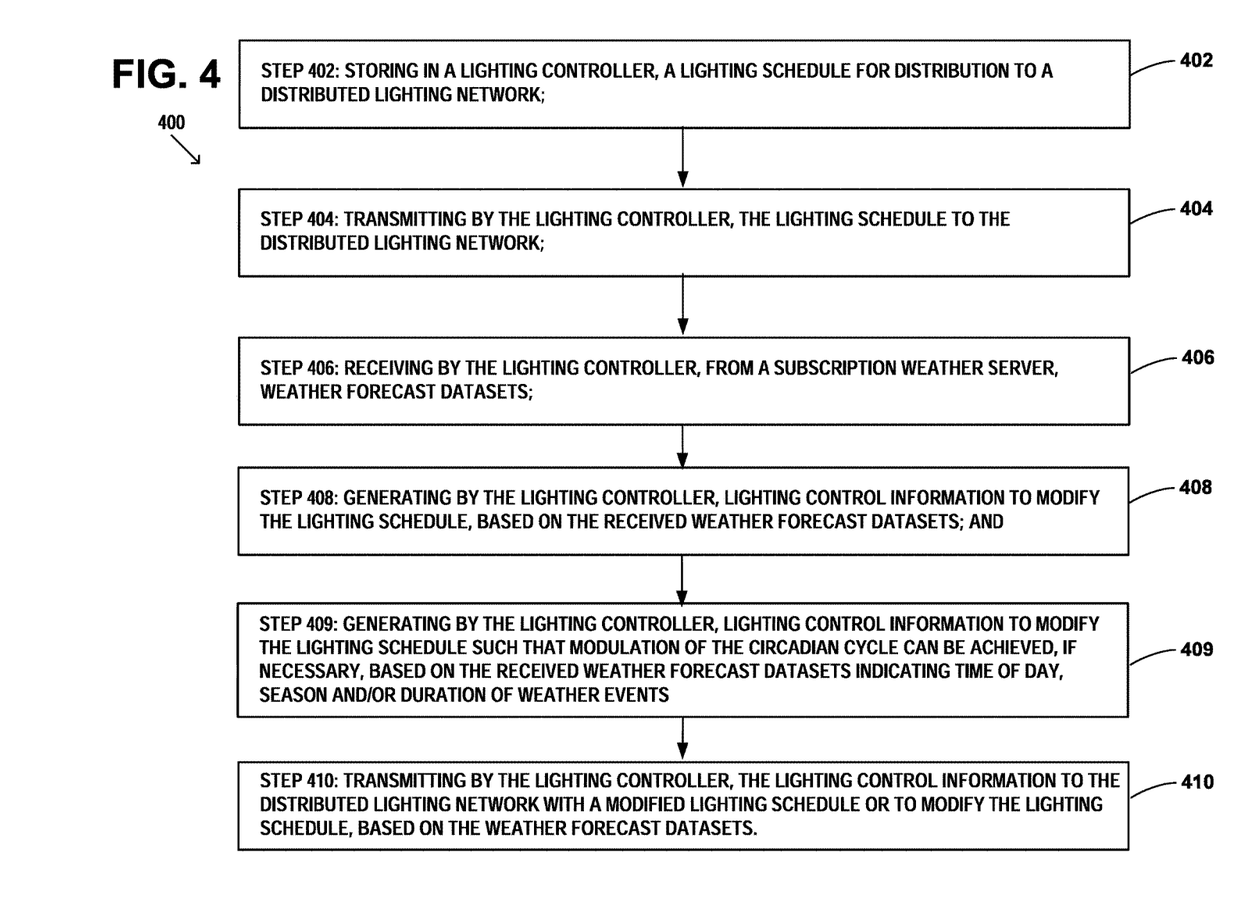
FIG. 4 illustrates an example flow diagram of steps performed by the lighting controller in controlling the distributed lighting network based on weather forecast information.

FIG. 4 illustrates an example flow diagram 400 of steps performed by the lighting controller for controlling the distributed lighting network based on weather forecast information. The steps of the flow diagram 400 represent computer code instructions stored in the RAM and/or ROM memory, which when executed by the central processing units (CPU), carry out the functions of the example embodiments of the invention. The steps may be carried out in another order than shown and individual steps may be combined or separated into component steps. The flow diagram has the following steps:

Step 402: storing in a lighting controller, a lighting schedule for distribution to a distributed lighting network;

Step 404: transmitting by the lighting controller, the lighting schedule to the distributed lighting network;

Step 406: receiving by the lighting controller, from a subscription weather server, weather forecast datasets;

Step 408: generating by the lighting controller, lighting control information to modify the lighting schedule, based on the received weather forecast datasets;

Step 409: generating by the lighting controller, lighting control information to modify the lighting schedule such that modulation of the circadian cycle can be achieved, if necessary, based on the received weather forecast datasets indicating time of day, season and/or duration of weather events Step 410: transmitting by the lighting controller, the lighting control information to the distributed lighting network with a modified lighting schedule or to modify an existing lighting schedule, based on the weather forecast datasets.

Although specific example embodiments of the invention have been disclosed, persons of skill in the art will appreciate that changes may be made to the details described for the specific example embodiments, without departing from the spirit and the scope of the invention.

What is claimed is:

1. A system for controlling a distributed lighting network based on weather forecast information, comprising:
   a lighting controller, configured to distribute a lighting schedule or update one or more existing lighting schedules to the distributed lighting network;
   a plurality of lighting devices in the distributed network, at least a sub-plurality of the plurality of lighting devices configured to receive and store at least a portion of the lighting schedule distributed by the lighting controller;
   the lighting controller, further configured to receive weather forecast datasets from a subscription weather server; and
   the lighting controller, further configured to distribute lighting control signals to the distributed lighting network to modify or replace the portion of the lighting schedule stored in the sub-plurality of lighting devices, based on the weather forecast datasets.

2. The system of claim 1, wherein the lighting schedule is at least one of static, periodic by day, week, month, season, year, or adjusted due to time of day or weather event duration to achieve a desired impact on human circadian cycle.

3. The system of claim 1, wherein the lighting schedule controls on/off lighting, light dimming sequences to an on or off state, light color frequency selection, light color intensity of red, green, and blue light components, light level brightening based on predicted duration for type of weather condition, or light level brightening based on length of daylight for day of year.

4. The system of claim 1, wherein the weather forecast datasets from the subscription weather server comprise data representing localized weather forecasts for a geographical region encompassing the distributed lighting network, the datasets comprising at least one of tables, maps, or sensor information that includes at least one of cloud cover information, on-going weather events, ambient temperature, pressure, or humidity.

5. The system of claim 1, wherein the modification of the lighting schedule comprises at least one of changing times for lighting to go on or off, changing color/frequency of the lighting, brightening intensity in response to a severe storm, a softer intensity in response to a moderate storm, changing dimming, or changing rate of onset of light change.

6. The system of claim 1, wherein the lighting controller, is further configured to distribute lighting control signals to the distributed lighting network to modify the lighting schedule, based on lunar phases or level of starlight, in combination with the received weather forecast datasets.

7. The system of claim 1, wherein the modification of the lighting schedule comprises changing spectral range of lighting to visual acuity during periods of weather events, cloudiness or overcast.

8. The system of claim 1, wherein the modification of the lighting schedule comprises changing lighting intensity to enhance night vision during periods of weather events, cloudiness or overcast.

9. The system of claim 1, wherein the modification of the lighting schedule comprises changing brightness or spectral range of lighting to counteract a mood of depression due to seasonal affective disorder during periods of cloudiness, weather events or overcast.

10. The system of claim 1, wherein the subscription weather server bases the weather forecast datasets on at least one of images from one or more cameras or sensor data from one or more sensors in a geographical region encompassing the distributed lighting network.

11. An apparatus for controlling a distributed lighting network based on weather forecast information, comprising:
  a memory in the apparatus, configured to store a lighting schedule for distribution to the distributed lighting network;
  a transmitter in the apparatus, configured to distribute the lighting schedule to the distributed lighting network;
  a receiver in the apparatus, coupled to a subscription weather server, configured to receive long-term and short-term weather forecast datasets;
  a processor in the apparatus, configured to generate lighting control information to modify the lighting schedule, based on the received weather forecast datasets; and
  the transmitter in the apparatus, further configured to distribute the lighting control information to the distributed lighting network to modify the lighting schedule, based on the weather forecast datasets.

12. The apparatus of claim 11, wherein the lighting schedule is at least one of static, periodic by day, week, month, season, year, or adjusted due to time of day or weather event duration to achieve a desired impact on human circadian cycle.

13. The apparatus of claim 11, wherein the lighting schedule controls on/off lighting, light dimming sequences to an on or off state, light color frequency selection, light color intensity of red, green, and blue light components, light level brightening based on predicted duration for type of weather condition, or light level brightening based on length of daylight for day of year.

14. The apparatus of claim 11, wherein the weather forecast datasets from the subscription weather server comprise data representing localized weather forecasts for a geographical region encompassing the distributed lighting network, the datasets comprising at least one of tables, maps, or sensor information that includes at least one of cloud cover information, on-going weather events, ambient temperature, pressure, or humidity.

15. The apparatus of claim 11, wherein the modification of the lighting schedule comprises at least one of changing times for lighting to go on or off, changing color/frequency of the lighting, brightening intensity in response to a severe storm, a softer intensity in response to a moderate storm, changing dimming, or changing rate of onset of light change.

16. The apparatus of claim 11, wherein the lighting controller, is further configured to distribute lighting control signals to the distributed lighting network to modify the lighting schedule, based on lunar phases or level of starlight, in combination with the received weather forecast datasets.

17. The apparatus of claim 11, wherein the modification of the lighting schedule comprises changing spectral range of lighting to enhance visual acuity during periods of weather events cloudiness or overcast.

18. The apparatus of claim 11, wherein the modification of the lighting schedule comprises changing lighting intensity to enhance night vision during periods of weather events, cloudiness or overcast.

19. The apparatus of claim 11, wherein the modification of the lighting schedule comprises changing brightness or spectral range of lighting to counteract a mood of depression due to seasonal affective disorder during periods of weather events, cloudiness or overcast.

20. The apparatus of claim 11, wherein the subscription weather server bases the weather forecast datasets on at least one of images from one or more cameras or sensor data from one or more sensors in a geographical region encompassing the distributed lighting network.

21. A method for controlling a distributed lighting network based on weather forecast information, comprising:
  storing in an apparatus, a lighting schedule for distribution to the distributed lighting network;
  transmitting by the apparatus, the lighting schedule to the distributed lighting network;
  receiving by the apparatus, from a subscription weather server, weather forecast datasets;
  generating by the apparatus, lighting control information to modify the lighting schedule, based on the received weather forecast datasets; and
  transmitting by the apparatus, the lighting control information to the distributed lighting network to modify the lighting schedule, based on the weather forecast datasets.

22. The method of claim 21, wherein the lighting schedule is at least one of static, periodic by day, week, month, season, year, or adjusted due to time of day or weather event duration to achieve a desired impact on human circadian cycle.

23. The method of claim 21, wherein the lighting schedule controls on/off lighting, light dimming sequences to an on or off state, light color frequency selection, light color intensity of red, green, and blue light components, light level brightening based on predicted duration for type of weather condition, or light level brightening based on length of daylight for day of year.

24. The method of claim 21, wherein the weather forecast datasets from the subscription weather server comprise data representing localized weather forecasts for a geographical region encompassing the distributed lighting network, the datasets comprising at least one of tables, maps, or sensor information that includes at least one of cloud cover information, on-going weather events, ambient temperature, pressure, or humidity.

25. The method of claim 21, wherein the modification of the lighting schedule comprises at least one of changing times for lighting to go on or off, changing color/frequency of the lighting, brightening intensity in response to a severe storm, a softer intensity in response to a moderate storm, changing dimming, or changing rate of onset of light change.

26. The method of claim 21, wherein the lighting controller, is further configured to distribute lighting control signals to the distributed lighting network to modify the lighting schedule, based on lunar phases or level of starlight, in combination with the received weather forecast datasets.

27. The method of claim 21, wherein the modification of the lighting schedule comprises changing spectral range of lighting to enhance visual acuity during periods of weather events, cloudiness or overcast.

28. The method of claim 21, wherein the modification of the lighting schedule comprises changing lighting intensity to enhance night vision during periods of weather events, cloudiness or overcast.

29. The method of claim 21, wherein the modification of the lighting schedule comprises changing brightness or spectral range of lighting to counteract a mood of depression due to seasonal affective disorder during periods of weather events, cloudiness or overcast.

30. The method of claim 21, wherein the subscription weather server bases the weather forecast datasets on at least one of images from one or more cameras or sensor data from one or more sensors in a geographical region encompassing the distributed lighting network.

* * * * *